(12) United States Patent
Bao

(10) Patent No.: US 12,388,570 B2
(45) Date of Patent: Aug. 12, 2025

(54) DATA TRANSMISSION METHOD, DEVICE, AND MEDIUM

(71) Applicant: VIVO MOBILE COMMUNICATION CO., LTD., Guangdong (CN)

(72) Inventor: Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 691 days.

(21) Appl. No.: 17/728,057

(22) Filed: Apr. 25, 2022

(65) Prior Publication Data

US 2022/0247517 A1   Aug. 4, 2022

Related U.S. Application Data

(63) Continuation of application No. PCT/CN2020/126765, filed on Nov. 5, 2020.

(30) Foreign Application Priority Data

Nov. 6, 2019   (CN) .......................... 201911078540.0

(51) Int. Cl.
  *H04L 1/1607*   (2023.01)
  *H04L 1/1812*   (2023.01)
  *H04L 5/00*    (2006.01)
  *H04W 28/04*   (2009.01)

(52) U.S. Cl.
  CPC .......... *H04L 1/1607* (2013.01); *H04L 1/1812* (2013.01); *H04L 5/0055* (2013.01); *H04W 28/04* (2013.01)

(58) Field of Classification Search
  CPC .... H04W 28/04; H04L 5/0055; H04L 1/1812; H04L 1/1607

USPC ......................................................... 370/329
See application file for complete search history.

(56) References Cited

U.S. PATENT DOCUMENTS

| | | | |
|---|---|---|---|
| 2013/0242720 A1 | 9/2013 | Chou | |
| 2018/0316460 A1 | 11/2018 | Navratil et al. | |
| 2019/0158231 A1 | 5/2019 | Zhang et al. | |
| 2019/0181941 A1* | 6/2019 | Kim | H04B 7/0695 |

(Continued)

FOREIGN PATENT DOCUMENTS

| CN | 107615692 A | 1/2018 |
|---|---|---|
| CN | 108923894 A | 11/2018 |

(Continued)

OTHER PUBLICATIONS

1st Chinese Office Action.

(Continued)

*Primary Examiner* — Peter G Solinsky
(74) *Attorney, Agent, or Firm* — BROOKS KUSHMAN P.C.

(57) ABSTRACT

A data transmission method, a device, and a medium are disclosed. The data transmission method includes: determining hybrid automatic repeat request HARQ feedback type configuration information of a sending terminal device, where the HARQ feedback type configuration information is configured based on service information of a service, and the service information includes a quality of service QoS parameter of the service and/or group information of the service; and sending a data packet to a receiving terminal device based on the HARQ feedback type configuration information.

20 Claims, 4 Drawing Sheets

S301

Receive a data packet sent by a sending terminal device, where the data packet carries feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service

S302

Provide a HARQ feedback to the sending terminal device based on the feedback indication information

(56) References Cited

U.S. PATENT DOCUMENTS

| | | | |
|---|---|---|---|
| 2020/0092692 A1* | 3/2020 | Wang | H04W 76/14 |
| 2020/0322099 A1* | 10/2020 | Park | H04W 72/20 |
| 2020/0366421 A1 | 11/2020 | Tang et al. | |
| 2022/0045800 A1 | 2/2022 | Chen | |
| 2022/0052792 A1* | 2/2022 | Lee | H04W 4/06 |
| 2022/0103309 A1* | 3/2022 | Lee | H04L 1/00 |
| 2022/0191725 A1* | 6/2022 | Ashraf | H04L 5/0053 |

FOREIGN PATENT DOCUMENTS

| | | | | |
|---|---|---|---|---|
| CN | 111431671 | A | 7/2020 | |
| CN | 1111431671 | A | 7/2020 | |
| TW | 201342841 | A | 10/2013 | |
| WO | WO2018014704 | A1 | 1/2018 | |
| WO | 2019153125 | A1 | 8/2019 | |
| WO | 2019153911 | A1 | 8/2019 | |
| WO | 2020088648 | A1 | 5/2020 | |
| WO | WO-2020192778 | A1 * | 10/2020 | H04L 1/1607 |

OTHER PUBLICATIONS

1st Indian Office Action.
International Search Report and Written Opinion.
First Office Action for Korean Application No. 10-2022-7016757, dated Oct. 18, 2024, 5 Pages.
Extended European Search Report for Application No. 20884190.8-1213, dated Nov. 8, 2022, 11 Pages.
First Office Action for Chinese Application No. 201911078540.0, dated Sep. 26, 2021, 9 Pages.
International Search Report and Written Opinion for Application No. PCT/CN2020/126765, dated Feb. 18, 2021, 11 Pages.
First Office Action for Indian Application No. 202227023608, dated Sep. 21, 2022, 6 Pages.
Ericsson, "HARQ Procedure for SL Groupcast," 3GPP TSG-RAN WG2 #106, Agenda item 11.4.2, May 13-17, 2019, TDoc R2-1907344, Reno, NV, US, 4 Pages.
Huawei, et al., "Discussion on HARQ Feedback Enable and Disable," 3GPP TSG-RAN WG2 #106, Agenda item 11.4.2, May 13-17, 2019, R2-1907416, Reno, NV, US, 5 Pages.
Lenovo, et al., "HARQ Feedback Impact on RAN2," 3GPP TSG RAN WG2 #107bis, Agenda item 6.4.6, Oct. 14-18, 2019, R2-1912565, Chongqin, People's Republic of China, 4 Pages.
Vivo, "Remaining Issues on HARQ Support for NR Sidelink," 3GPP TSG-RAN WG2 #108, Agenda item 6.4.2, Nov. 18-22, 2019, R2-1914924, Reno, NV, US, 6 Pages.

* cited by examiner

DATA TRANSMISSION METHOD, DEVICE, AND MEDIUM

CROSS-REFERENCE TO RELATED APPLICATIONS

This application is continuation of PCT International Application No. PCT/CN2020/126765 filed on Nov. 5, 2020, which claims priority to Chinese Patent Application No. 201911078540.0, filed on Nov. 6, 2019, which are incorporated herein by reference in their entireties.

TECHNICAL FIELD

Embodiments of this disclosure relate to the field of communications technologies, and in particular, to a data transmission method, a device, and a medium.

BACKGROUND

Both a long term evolution (LTE) system and a new radio (NR) system can support a sidelink (side link). The sidelink can be used for a direct data transmission between terminal devices without using a network device, such as vehicle to everything (V2X) communication.

However, an LTE sidelink is dominated by broadcast services, and does not have a hybrid automatic repeat request (HARQ) feedback mechanism, resulting in low data transmission quality and low data transmission efficiency. For an NR sidelink, although the HARQ feedback mechanism is introduced, there is only a single configured feedback type. Consequently, feedback efficiency is low, and data transmission quality and data transmission efficiency are low.

SUMMARY

Embodiments of this disclosure provide a data transmission method, a device, and a medium.

According to a first aspect, an embodiment of this disclosure provides a data transmission method, applied to a sending terminal device and including:
  determining HARQ feedback type configuration information of the sending terminal device, where the HARQ feedback type configuration information is configured based on service information of a service, and the service information includes a quality of service (QoS) parameter of the service and/or group information of the service; and
  sending a data packet to a receiving terminal device based on the HARQ feedback type configuration information.

According to a second aspect, an embodiment of this disclosure provides a data transmission method, applied to a network device and including:
  receiving service information sent by a sending terminal device, where the service information includes a QoS parameter of a service and/or group information of the service;
  configuring HARQ feedback type configuration information based on the service information; and
  sending the HARQ feedback type configuration information to the sending terminal device.

According to a third aspect, an embodiment of this disclosure provides a data transmission method, applied to a receiving terminal device and including:
  receiving a data packet sent by a sending terminal device, where the data packet includes feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service; and
  providing a HARQ feedback to the sending terminal device based on the feedback indication information.

According to a fourth aspect, an embodiment of this disclosure provides a sending terminal device, including:
  a feedback type determining module, configured to determine HARQ feedback type configuration information configured by a network device to which the sending terminal device belongs, where the HARQ feedback type configuration information is configured based on service information of a service, and the service information includes a QoS parameter of the service and/or group information of the service; and
  a service data sending module, configured to send a data packet to a receiving terminal device based on the HARQ feedback type configuration information.

According to a fifth aspect, an embodiment of this disclosure provides a network device, including:
  a service information receiving module, configured to receive service information sent by a sending terminal device, where the service information includes a QoS parameter of a service and/or group information of the service;
  a feedback type configuration module, configured to configure HARQ feedback type configuration information based on the service information; and
  a feedback type sending module, configured to send the HARQ feedback type configuration information to the sending terminal device.

According to a sixth aspect, an embodiment of this disclosure provides a receiving terminal device, including:
  a service data receiving module, configured to receive a data packet sent by a sending terminal device, where the data packet includes feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service; and
  a receiving result feedback module, configured to provide a HARQ feedback to the sending terminal device based on the feedback indication information.

According to a seventh aspect, an embodiment of this disclosure provides a terminal device, including a processor, a memory, and a computer program stored in the memory and capable of running on the processor, where when the computer program is executed by the processor, the steps of the data transmission method according to the first aspect or the third aspect are implemented.

According to an eighth aspect, an embodiment of this disclosure provides a network device, including a processor, a memory, and a computer program stored in the memory and capable of running on the processor, where when the computer program is executed by the processor, the steps of the data transmission method according to the second aspect are implemented.

According to a ninth aspect, an embodiment of this disclosure provides a computer-readable storage medium, where the computer-readable storage medium stores a computer program, and when the computer program is executed by a processor, the steps of the data transmission method according to the first aspect, the second aspect, or the third aspect are implemented.

BRIEF DESCRIPTION OF DRAWINGS

The specific embodiments of this disclosure hereinafter described with reference to the accompanying drawings can make this disclosure better comprehensible, where identical or similar reference numerals represent identical or similar features.

DETAILED DESCRIPTION

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The embodiments of this disclosure provide a data transmission method, a device, and a medium, which may be applied to a scenario in which data is transmitted between a sending terminal device and a receiving terminal device based on a 5G NR sidelink without using a network device. According to the data transmission method in the embodiments of this disclosure, service information can be used to flexibly configure various feedback types of a HARQ mechanism. Therefore, a problem that data transmission quality and data transmission efficiency are reduced due to low feedback efficiency in a case of a single feedback type is avoided. The sending terminal device and the receiving terminal device may both be user terminals (UE), or may be other terminal devices. This is not limited herein. The network device may be a base station or another network device. This is not limited herein. For ease of description, the following description is provided by using an example in which a sending terminal device is sending-end UE, a receiving terminal device is receiving-end UE, and a network device is a base station.

Figure 1:
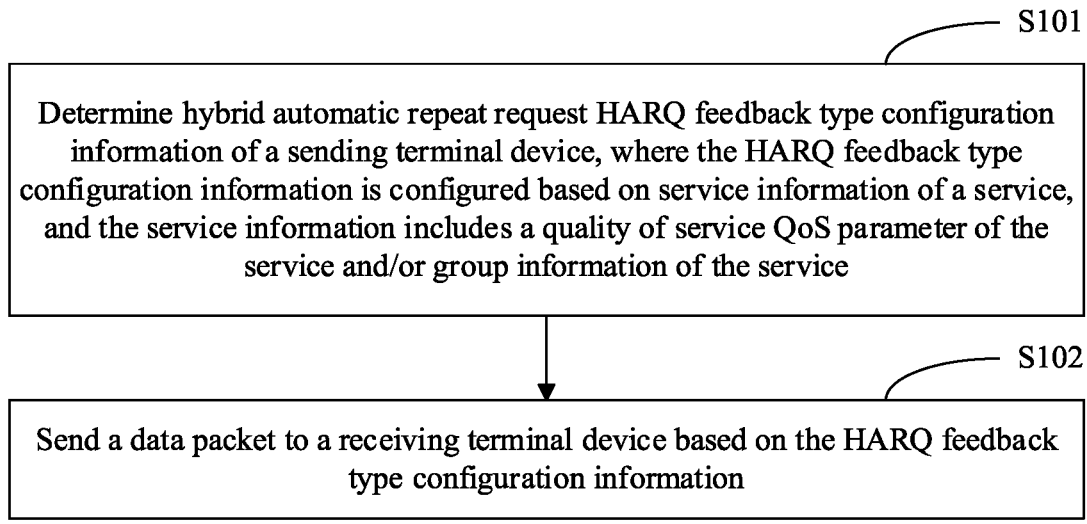
FIG. 1 is a schematic flowchart of a data transmission method according to an embodiment in a first aspect of this disclosure.

FIG. 1 is a schematic flowchart of a data transmission method according to an embodiment in a first aspect of this disclosure. As shown in FIG. 1, the data transmission method may be performed by a sending terminal device, such as sending-end UE. Specifically, the data transmission method may include the following steps.

S101. Determine hybrid automatic repeat request HARQ feedback type configuration information of the sending terminal device, where the HARQ feedback type configuration information is configured based on service information of a service, and the service information includes a quality of service QoS parameter of the service and/or group information of the service.

S102. Send a data packet to a receiving terminal device based on the HARQ feedback type configuration information.

In this embodiment of this disclosure, the HARQ feedback type configuration information of the sending terminal device can be determined based on the QoS parameter of the service and/or the group information of the service in the service information, and the data packet can be sent to the receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

In some embodiments of this disclosure, the quality of service QoS parameter may include at least one of the following:

service rate information, delay information, priority information, and block error rate information.

In some embodiments of this disclosure, the group information may include at least a size of a group to which the service needs to be sent, that is, the total number of terminal devices in the group.

In some embodiments of this disclosure, the service information may be obtained by the sending terminal device from a V2X layer.

Current sidelink transmission mainly includes transmission forms such as broadcast, groupcast, and unicast. Both the unicast and groupcast transmission forms support a physical layer HARQ feedback mechanism.

Therefore, the data transmission method in this embodiment of this disclosure is hereinafter described in detail with respect to the two transmission forms of unicast and groupcast.

In some embodiments of this disclosure, the HARQ feedback type configuration information configured based on the service information of the service may include any one of the following:

information for indicating that none of the receiving terminal devices provides a feedback;

information for indicating that a receiving terminal device failing to receive the data packet feeds back a negative acknowledgement NACK signal at a same feedback position; and information for indicating that a receiving terminal device successfully receiving the data packet feeds back an acknowledgement ACK signal at a feedback position corresponding to the receiving terminal device, and indicating that a receiving terminal device failing to receive the data packet feeds back a NACK signal at a feedback position corresponding to the receiving terminal device.

The number of feedback positions in a transmission resource pool also limits feedback positions that can be used for a HARQ feedback. Therefore, in other embodiments of this disclosure, the HARQ feedback type configuration information configured based on the service information of the service may include any one of the following:

information for indicating that none of the receiving terminal devices provides a feedback;

information for indicating that a receiving terminal device failing to receive the data packet feeds back a negative acknowledgement NACK signal at a same feedback position;

information for indicating that a receiving terminal device successfully receiving the data packet feeds back an acknowledgement ACK signal at a feedback position corresponding to the receiving terminal device, and indicating that a receiving terminal device failing to receive the data packet feeds back a NACK signal at a feedback position corresponding to the receiving terminal device;

information for indicating that the receiving terminal devices provide a feedback in groups, where a receiving terminal device failing to receive the data packet in each group feeds back a NACK signal at a feedback position corresponding to the group; and information for indicating that the receiving terminal devices provide a feedback in groups, where a receiving terminal device successfully receiving the data packet in each group feeds back an ACK signal at a feedback position corresponding to the group, and a receiving terminal device failing to receive the data packet in each group feeds back a NACK signal at a feedback position corresponding to the group.

A specific method for determining each piece of the HARQ feedback type configuration information is described in detail later, and is not described herein.

It should be noted that in unicast transmission mode, because there is only one receiving-end UE, in unicast transmission mode, only one feedback position is required for a HARQ feedback. Therefore, in a case of determining that a HARQ feedback needs to be provided, only one HARQ feedback type configuration scheme is available: A receiving terminal device that fails to receive the data packet feeds back a negative acknowledgement NACK signal at a same feedback position. However, in groupcast transmission mode, because there are a plurality of receiving-end UEs, one or more feedback positions may be required for a HARQ feedback. Therefore, in a case of determining that a HARQ feedback needs to be provided, any one of the foregoing HARQ feedback type configuration schemes may be available.

Current resource allocation modes for sidelink UE are classified into a base station scheduling mode (Mode 1) and a UE autonomous mode (Mode 2). In mode 1, a base station to which the UE belongs controls and allocates a resource. In mode 2, the UE selects a resource autonomously.

The following separately describes, based on two different resource allocation modes, how the sending-end UE determines the HARQ feedback type configuration information configured by the base station to which the sending-end UE belongs for the service corresponding to the to-be-sent data packet.

1. Mode 1

In some embodiments of this disclosure, the determining HARQ feedback type configuration information of the sending terminal device in S101 may include:

in a case that the sending terminal device is in a connected state, sending the service information to a network device; and receiving the HARQ feedback type configuration information configured by the network device.

For the sending-end UE, when the sending-end UE needs to initiate a unicast service or a groupcast service, if the sending-end UE is in the connected state, the sending-end UE can directly interact with the network device to which the sending-end UE belongs, that is, the base station. The sending-end UE may send the QoS parameter of the service corresponding to the to-be-sent data packet and/or the group information of the service to the base station, to request the base station to configure the HARQ feedback type configuration information for the sending-end UE. Specifically, the base station may configure the HARQ feedback type configuration information for the to-be-sent data packet based on the QoS parameter, the QoS parameter and the group information, the QoS parameter and a feedback resource configuration of the transmission resource pool, the group information and a feedback resource configuration, or the QoS parameter, the group information and a feedback resource configuration. A method for configuring the HARQ feedback type configuration information by the base station is described in detail later, and is not described herein.

In some embodiments of this disclosure, if the network device also configures the corresponding transmission resource pool for the sending-end UE, the HARQ feedback type configuration information configured by the network device may also include transmission resource pool information, so that the sending-end UE can transmit the data packet in the transmission resource pool based on the HARQ feedback type configuration information. The transmission resource pool information includes feedback resource configuration information, where the transmission resource pool corresponds to a HARQ feedback type in the HARQ feedback type configuration information.

In other embodiments of this disclosure, if the network device may not configure the corresponding transmission resource pool for the sending-end UE, the HARQ feedback type configuration information configured by the network device does not include transmission resource pool information, so that the sending-end UE needs to select, from a common transmission resource pool, a resource pool that satisfies the HARQ feedback type configuration information to transmit the data packet.

2. Mode 2

In other embodiments of this disclosure, a specific method for determining the HARQ feedback type configuration information of the sending terminal device in S101 may include:

in a case that the sending terminal device is in a non-connected state, determining, according to a mapping rule in system information sent by a network device, the HARQ feedback type configuration information corresponding to the service information.

The system information sent by the network device is system information sent by the network device and received when the sending terminal device is in a connected state.

In these embodiments, the sending-end UE may also determine, according to a preconfigured mapping rule, the HARQ feedback type configuration information corresponding to the service information.

For the sending-end UE, when the sending-end UE needs to initiate a unicast service or a groupcast service, if the sending-end UE is in the non-connected state, that is, the sending-end UE is idle/inactive sending-end UE, the sending-end UE does not need to interact with the base station, and the sending-end UE can autonomously determine, according to the stored mapping rule in the system information sent by the network device to which the sending-end UE belongs or the preconfigured mapping rule and the service information, the HARQ feedback type configuration information corresponding to the to-be-sent data packet.

In some embodiments of this disclosure, after the determining, according to a mapping rule in system information sent by a network device, the HARQ feedback type configuration information corresponding to the service information, the data transmission method may further include:

in a case that a feedback resource configuration of a common transmission resource pool does not meet a feedback requirement corresponding to the HARQ feedback type configuration information, determining whether to allow the sending terminal device to switch from the non-connected state to a connected state.

For example, in a case that a plurality of feedback positions are required for a HARQ feedback, if the common transmission resource pool cannot provide transmission resources of the corresponding feedback positions for the sending-end UE, that is, the feedback resource configuration of the common transmission resource pool does not meet the feedback requirement corresponding to the HARQ feedback type configuration information, it is necessary to determine whether the sending-end UE can be switched from the non-connected state to the connected state.

In this embodiment of this disclosure, for the sending-end UE in the non-connected state, generally, a transmission position of the sending-end UE is obtained from the common transmission resource pool, and the common transmission resource pool is sent in the broadcast system information.

For example, common transmission resource pools in a network may be classified into the following types:
  a common transmission resource pool without a feedback position, where the common transmission resource pool may be used for a data transmission without a HARQ feedback;
  a common transmission resource pool with a fixed feedback position for each transmission position, where the common transmission resource pool may be used for a HARQ feedback that requires a feedback position, and the feedback position and the transmission position are configured or have a mutual relationship specified in a standard, for example, the feedback position is a time domain position 1 ms or 3 ms after a last boundary of the transmission position, and a frequency domain position is derived from the transmission position; and
  a common transmission resource pool with a plurality of feedback positions for each transmission position, where the common transmission resource pool may be used for a HARQ feedback that requires a plurality of feedback positions, and the feedback position and the transmission position are configured or have a mutual relationship specified in a standard, for example, the feedback position is a time domain position 1 ms or 3 ms after a last boundary of the transmission position, and frequency domain positions of the plurality of feedback positions are continuous and are all derived from the transmission position.

When a HARQ feedback at a plurality of feedback positions is allowed for the sending-end UE, the sending-end UE selects, from the common transmission resource pool, a common transmission resource matching the number of receiving terminal devices in the group information for the transmission. For example, the maximum number of feedback positions allowed by the common transmission resource is greater than or equal to the number of receiving terminal devices. If no common transmission resource matching the number of receiving terminal devices is found, for example, the maximum number of feedback positions allowed in each common transmission resource is less than the number of receiving terminal devices, it is necessary to determine whether the sending-end UE can be switched from the non-connected state to the connected state.

In other embodiments of this disclosure, after the determining whether to allow the sending terminal device to switch from the non-connected state to a connected state, the data transmission method may further include:

if the feedback resource configuration does not meet the feedback requirement and the sending terminal device is allowed to switch from the non-connected state to the connected state, switching the sending terminal device from the non-connected state to the connected state.

Specifically, if the HARQ feedback mode is a plurality of feedbacks, and the maximum number of feedback positions allowed by the common transmission resource pool is less than the number of receiving terminal devices in the group information, and the HARQ feedback allows the sending terminal device to switch from the non-connected state to the connected state, the sending-end UE can be switched from the non-connected state to the connected state. For example, the sending-end UE may be enabled to establish a radio resource control (RRC) connection, and then enter the connected state, and request an appropriate resource from the network device by using dedicated signaling.

In some embodiments of this disclosure, when the sending-end UE needs to send a groupcast service, a HARQ feedback mode allowed by the network device may be first obtained based on a mapping relationship between the QoS parameter of the service and the HARQ feedback mode.

In these embodiments, the mapping rule may include at least one of the following:
  a mapping relationship between a standardized QoS parameter and a HARQ feedback requirement;
  a mapping relationship between a standardized QoS parameter and a HARQ feedback requirement for a plurality of feedback positions;
  a mapping relationship between a standardized QoS parameter and the maximum number of feedback positions supported for a HARQ feedback;
  a mapping relationship between one or more QoS parameters meeting a predetermined condition and a HARQ feedback requirement;
  a mapping relationship between one or more QoS parameters meeting a predetermined condition and a HARQ feedback requirement for a plurality of feedback positions; and
  a mapping relationship between one or more QoS parameters meeting a predetermined condition and the maximum number of feedback positions supported for a HARQ feedback.

Standardized QoS parameters are a group of QoS parameters with specific values defined in the standard, and each group of standardized QoS parameters has a standardized identifer. For example, a QoS ID 1 to a QoS ID 8 are corresponding values in a standardized QoS parameter list in the standard. In this case, the mapping relationship between the standardized QoS parameter and the HARQ feedback requirement may be specified in the system information as follows: QoS IDs 1, 3, and 4 do not require a HARQ feedback, and other QoS IDs require a HARQ feedback; or the mapping relationship between the standardized QoS parameter and the HARQ feedback requirement for the plurality of feedback positions may be specified in the system information as follows: QoS IDs 1, 3, and 4 do not require a HARQ feedback, and other QoS IDs require a HARQ feedback at a plurality of feedback positions.

Therefore, only configurations with HARQ feedback requirements or not may be distinguished based on the mapping relationship, and the sending-end UE may determine a HARQ feedback at one position or a HARQ feedback at a plurality of feedback positions based on other conditions, or may directly determine a HARQ feedback at one position or a HARQ feedback at a plurality of feedback positions based on the mapping relationship, or may determine the maximum number of feedback positions supported for a HARQ feedback or the like based on the mapping relationship. Therefore, flexibility of configuring the HARQ feedback mode can be improved.

After the sending-end UE determines the HARQ feedback mode based on the QoS parameter, if it is determined that no HARQ feedback is required, the sending-end UE determines that the HARQ feedback type configuration information is that no receiving terminal device provides a feedback. If it is determined that no HARQ feedback is required, the sending-end UE may further determine the HARQ feedback type configuration information based on at least one of the HARQ feedback mode, the group information, the maximum number of feedback positions of the service, and the number of feedback positions in the transmission resource pool.

In other embodiments of this disclosure, the mapping rule may further include at least one of the following:

determining the HARQ feedback type configuration information based on the group information, where the group information mainly includes the total number of terminal devices in the group; for example, if there is no group information, allowing a receiving terminal device to provide a HARQ feedback at a same feedback position; if there is group information, allowing each receiving terminal device to provide a HARQ feedback at a feedback position corresponding to the receiving terminal device, but not allowing the sending-end UE not supporting a plurality of feedback positions as explicitly specified to use the plurality of feedback positions, that is, there is group information, but the service corresponding to the group information does not satisfy a condition of HARQ feedback at the plurality of feedback positions, for example, if the HARQ feedback type configuration information configures one feedback position for a HARQ feedback, a plurality of feedback positions cannot be used for the HARQ feedback;

determining the HARQ feedback type configuration information based on the number of receiving terminal devices in the group information and the maximum number of feedback positions of the service; for example, if the number of receiving terminal devices in the group information is less than or equal to the maximum number of feedback positions of the service, allowing each receiving terminal device to provide a HARQ feedback at a feedback position corresponding to the receiving terminal device; if the number of receiving terminal devices in the group information is greater than the maximum number of feedback positions of the service, allowing the receiving terminal devices to provide a group feedback, that is, each group of receiving terminal devices provides a HARQ feedback at a feedback position corresponding to the group;

determining the HARQ feedback type configuration information based on the number of receiving terminal devices in the group information and the number of feedback positions in a transmission resource pool; and determining the HARQ feedback type configuration information based on the number of receiving terminal devices in the group information, the maximum number of feedback positions of the service, and the number of feedback positions in the transmission resource pool; for example, if the number of receiving terminal devices in the group information is less than or equal to the maximum number of feedback positions of the service and the number of receiving terminal devices in the group information is less than or equal to the number of feedback positions in the transmission resource pool, determining that resources are appropriate, and allowing each receiving terminal device to provide a HARQ feedback at a feedback position corresponding to the receiving terminal device; if the number of receiving terminal devices in the group information is less than or equal to the maximum number of feedback positions of the service and the number of receiving terminal devices in the group information is greater than the number of feedback positions in the transmission resource pool, determining that resources are inappropriate, grouping the receiving terminal devices based on the number of feedback positions, and allowing each group of receiving terminal devices to provide a HARQ feedback at a feedback position corresponding to the group. Specifically, if the service can support up to 10 feedback positions, and the number of receiving terminal devices is exactly 10, and the number of feedback positions in the transmission resource pool is 10 in this case, the resources are considered as appropriate; otherwise, if the number of feedback positions in the transmission resource pool is less than 10, the resources are considered as inappropriate, and the HARQ feedback type configuration information of the 10 feedback positions corresponding to the 10 receiving-end UEs cannot be selected; or if the number of feedback positions in the transmission resource pool is 5, the 10 receiving-end UEs may be divided into 5 groups to provide a feedback.

In some embodiments of this disclosure, the sending a data packet to a receiving terminal device based on the HARQ feedback type configuration information in S102 may include:

generating feedback indication information based on the HARQ feedback type configuration information; and sending the data packet carrying the feedback indication information to the receiving terminal device, so that the receiving terminal device can obtain the feedback indication information and provide a HARQ feedback based on the feedback indication information.

In some embodiments of this disclosure, the feedback indication information may include at least one of the following:

HARQ feedback requirement indication information, feedback resource configuration information, HARQ feedback requirement indication information for a plurality of feedback positions, feedback position number information, group feedback parameter information, and group feedback signal type information.

Specifically, the sending-end UE may select an appropriate feedback type and transmission resources based on the HARQ feedback type configuration information, and perform a data transmission.

For the receiving-end UE, before decoding the data packet correctly, the receiving-end UE does not know the service information corresponding to the data packet. Generally, the receiving-end UE, like the sending-end UE, can obtain the group information of the service corresponding to the data packet from the higher V2X layer. Specifically, the group information may include the total number of terminal devices in the group and identities (Identity, ID) of receiving-end UEs in the group.

However, merely based on the group information, the receiving-end UE cannot know which of the following feedback types is used for the data packet to be received: no HARQ feedback, a HARQ feedback, a HARQ feedback at one feedback position, and a HARQ feedback at a plurality of feedback positions, HARQ feedbacks in groups, and the like. Therefore, when sending the data packet, the sending-end UE needs to notify the receiving-end UE of specific feedback indication information, where the feedback indication information may specifically include the following content:

HARQ feedback requirement indication information, used to notify the receiving-end UE whether a HARQ feedback is required;

feedback resource configuration information, used to notify the receiving-end UE of a feedback position for a HARQ feedback, for example, a HARQ feedback 1 ms or 3 ms after a last moment of reception, or specific feedback frequency domain position information;

HARQ feedback requirement indication information for a plurality of feedback positions, used to notify the receiving-end UE whether a plurality of feedbacks are required, where if the HARQ feedback requirement indication information for the plurality of feedback positions includes only one bit, the HARQ feedback at the plurality of feedback positions can only be a HARQ feedback provided in a manner of allocating one feedback position to each receiving-end UE based on the total number of known terminal devices in the group to which the service belongs;

feedback position number, used to notify the receiving-end UE of a quantity value of a plurality of feedback positions, where if the number of feedback positions is displayed as a quantity value, the receiving-end UEs in the group to which the service belongs may be further allowed to provide a group feedback; for example, there are a total of 20 receiving-end UEs in the group, but there are only five feedback positions, and a group feedback is required;

group feedback parameter, used to notify the receiving-end UE of a group feedback parameter, for example, whether to provide a group feedback based on the receiving-end UE ID in the group, or provide a group feedback based on a distance between the receiving-end UE in the group and the sending-end UE; and group feedback signal type, used to notify the receiving-end UE whether to feed back a NACK signal only when the data packet fails to be received, or feed back an ACK signal when the data packet is successfully received and feed back a NACK signal when the data packet fails to be received, in a group feedback.

In some embodiments of this disclosure, the data transmission method may further include:

determining the maximum number of HARQ transmissions of the service.

The sending terminal device may determine its maximum number of transmissions of one data packet based on the maximum number of HARQ transmissions.

In some embodiments of this disclosure, the sending a data packet to a receiving terminal device in S102 may include:

sending the data packet including indication information about the maximum number of HARQ transmissions to the receiving terminal device, where the indication information about the maximum number of HARQ transmissions is used to indicate whether the current number of transmissions is the maximum number of HARQ transmissions.

The HARQ feedback is intended for an accurate retransmission based on an ACK signal and/or a NACK signal, to achieve an objective of improving a transmission success rate and reducing resource consumption. Generally, regardless of the groupcast transmission mode or the unicast transmission mode, after the NACK signal is received, a HARQ retransmission is required, to achieve an objective of correctly receiving data by the receiving-end UE. However, the retransmissions cannot be performed infinitely, and the maximum number of retransmissions needs to be limited. The maximum number of HARQ retransmissions is generally related to the QoS parameter of the service. For example, a service with a higher block error rate generally requires more retransmissions. More retransmissions mean higher resource consumption and a longer delay. Therefore, priority and delay requirements also need to be considered, to determine the maximum number of HARQ transmissions that can make data transmission resource consumption lower, the delay shorter, and the transmission success rate higher.

Specifically, before sending a data packet each time, the sending terminal device determines whether the current number of transmissions of the data packet is the maximum number of HARQ transmissions of the service corresponding to the data packet, and generates indication information about the maximum number of HARQ transmissions based on a determining result, so that the receiving terminal device can determine, based on the indication information about the maximum number of HARQ transmissions, whether the current number of transmissions is the maximum number of HARQ transmissions.

In some embodiments, when sending the data packet for the first time, the sending terminal device may send the data packet including the indication information about the maximum number of HARQ transmissions to the receiving-end UE.

In other embodiments, when the sending terminal device receives the NACK signal fed back by the receiving-end UE and the current number of transmissions is not the maximum number of HARQ transmissions, the sending terminal device may send the data packet including the indication information about the maximum number of HARQ transmissions to the receiving-end UE that feeds back the NACK signal.

The following separately describes, based on two different resource allocation modes, how the sending-end UE determines the maximum number of HARQ transmissions configured by the base station to which the sending-end UE belongs for the service corresponding to the to-be-sent data packet.

1. Mode 1

In some embodiments of this disclosure, the determining the maximum number of HARQ transmissions of the service may include:

in a case that the sending terminal device is in a connected state, sending the QoS parameter of the service to a network device; and receiving the maximum number of HARQ transmissions configured by the network device.

In a case that the sending terminal device is in the connected state, because the maximum number of HARQ transmissions is configured based on the QoS parameter, the sending-end UE in the connected state can report the QoS parameter to the network device to which the sending-end UE belongs, that is, the base station, and obtain a configuration value of the maximum number of HARQ transmissions from the base station.

When the network device configures HARQ feedback requirement indication information for the service, in a case that the sending terminal device has sent the QoS parameter to the network device, the network device can directly use the QoS parameter sent by the sending terminal device, without requiring the sending terminal device to send the QoS parameter again.

2. Mode 2

In other embodiments of this disclosure, the determining the maximum number of HARQ transmissions of the service may include:

in a case that the sending terminal device is in a non-connected state, determining, based on a mapping relationship between a QoS parameter and a transmission parameter in system information sent by a network device, the maximum number of HARQ transmissions of the service.

Specifically, for the sending-end UE in the non-connected state, the idle/inactive sending-end UE can obtain, by using the mapping relationship between the QoS parameter and the transmission parameter in the system information sent by the network device to which the sending-end UE belongs, a configuration value of the maximum number of HARQ transmissions corresponding to the QoS parameter of the service corresponding to the to-be-sent data packet; and the offline sending-end UE can obtain the configuration value of the maximum number of HARQ transmissions by using the preconfigured mapping relationship between the QoS parameter and the transmission parameter.

Generally, after obtaining the maximum number of HARQ transmissions, the sending-end UE may use the maximum number of HARQ transmissions as an upper limit, and send the data packet a plurality of times. However, it does not exclude a case that the sending-end UE terminates a HARQ retransmission in advance. For example, a service with a higher priority has preempted resources, or a transmission delay of the service will soon exceed a requirement, or the resource pool is currently congested. All these cases may cause the sending-end UE to terminate the retransmission in advance before the maximum number of retransmissions is reached.

Figure 2:
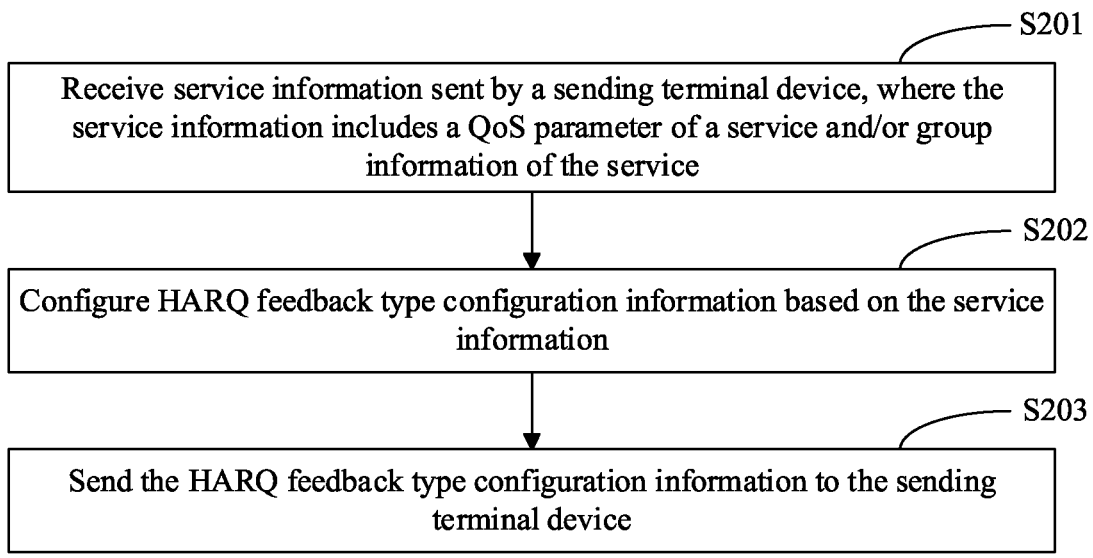
FIG. 2 is a schematic flowchart of a data transmission method according to an embodiment in a second aspect of this disclosure.

FIG. 2 is a schematic flowchart of a data transmission method according to an embodiment in a second aspect of this disclosure. As shown in FIG. 2, the data transmission method may be performed by a network device, such as a base station. Specifically, the data transmission method may include the following steps.

S201. Receive service information sent by a sending terminal device, where the service information includes a QoS parameter of a service and/or group information of the service.

S202. Configure HARQ feedback type configuration information based on the service information.

S203. Send the HARQ feedback type configuration information to the sending terminal device.

In this embodiment of this disclosure, the HARQ feedback type configuration information of the sending terminal device can be determined based on the QoS parameter of the service and/or the group information of the service in the service information, and a data packet can be sent to a receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

In some embodiments of this disclosure, the QoS parameter may include at least one of the following:

service rate information, delay information, priority information, and block error rate information.

In some embodiments of this disclosure, the group information may include at least a size of a group to which the service needs to be sent, that is, the total number of terminal devices in the group.

In S202 in some embodiments of this disclosure, after the base station receives the service information, the following operations may be performed:

first, determining, based on the QoS parameter of the service, whether a HARQ feedback is required, where generally, only a service with a high block error rate requirement needs to support a HARQ feedback; for example, a service with a block error rate of $10^{-1}$ does not need to support a HARQ feedback, and a service with a block error rate lower than $10^{-3}$ requires a HARQ feedback; if it is determined that no HARQ feedback is required, the HARQ feedback type configuration information may include information for indicating that none of the receiving terminal devices provides a feedback; and second, if determining to provide a HARQ feedback, it is necessary to configure the HARQ feedback type configuration information based on the group information of the service, where the configured HARQ feedback type configuration information may include any one of the following:

information for indicating that a receiving terminal device failing to receive the data packet feeds back a negative acknowledgement NACK signal at a same feedback position;

information for indicating that a receiving terminal device successfully receiving the data packet feeds back an acknowledgement ACK signal at a feedback position corresponding to the receiving terminal device, and indicating that a receiving terminal device failing to receive the data packet feeds back a NACK signal at a feedback position corresponding to the receiving terminal device;

information for indicating that the receiving terminal devices provide a feedback in groups, where a receiving terminal device failing to receive the data packet in each group feeds back a NACK signal at a feedback position corresponding to the group; and information for indicating that the receiving terminal devices provide a feedback in groups, where a receiving terminal device successfully receiving the data packet in each group feeds back an ACK signal at a feedback position corresponding to the group, and a receiving terminal device failing to receive the data packet in each group feeds back a NACK signal at a feedback position corresponding to the group.

The receiving terminal device that fails to receive the data packet feeds back a negative acknowledgement NACK signal at a same feedback position, and this feedback is a HARQ feedback at one feedback position. Other HARQ feedback type configuration information is a HARQ feedback at a plurality of feedback positions.

Generally, when sending-end UE does not obtain group information of a service from a V2X layer, that is, the sending-end UE only knows that this is a groupcast service, but the total number of terminal devices in a group and IDs of the terminal devices in the group are not clear, and the group information is not reported to the base station, only a HARQ feedback at one feedback position can be selected.

When service information reported by the sending-end UE includes group information, and the group information includes at least the total number of terminal devices in the group, a HARQ feedback at a plurality of feedback positions may be selected.

For selecting a group feedback or not, in addition to considering the total number of terminal devices in the group, it is also necessary to further consider a resource status of a transmission resource pool. This is because if the total number of terminal devices in the group is larger, more feedback positions are required, and overheads are higher. The HARQ feedback type configuration information can be configured as follows only in a case that a service requirement is relatively high, such as a high priority and/or high block error rate requirement, and resource load is tolerable: A receiving terminal device that successfully receives the data packet feeds back an acknowledgement ACK signal at a feedback position corresponding to the receiving terminal device, and a receiving terminal device that fails to receive the data packet feeds back a NACK signal at a feedback position corresponding to the receiving terminal device, so that each receiving-end UE has a dedicated feedback position to provide a more accurate feedback. If one or several receiving-end UEs fail to receive the data packet, a NACK signal is fed back, and a retransmission can be specially performed for the one or several receiving-end UEs.

Therefore, a group feedback is a compromise, and its effect and overhead are both between an effect and an overhead of a feedback provided by all receiving-end UEs at one feedback position and an effect and an overhead of a feedback provided by each receiving-end UE at a feedback position of the receiving-end UE. Specifically, the following grouping manner may be used to group the receiving-end UEs:

Based on the IDs of the terminal devices in the group, feedback positions are selected for a group feedback. For example, there are 40 receiving-end UEs in the group, and there are four feedback positions currently. In this case, the receiving-end UEs whose ID sequence is 1 to 10 (for example, IDs are 0 to 9) use a feedback position 1, the receiving-end UEs whose ID sequence is 11 to 20 (for example, IDs are 10 to 19) use a feedback position 2, and so on. Alternatively, each receiving-end UE uses its own ID to perform a modulo-4 operation, and when a result is 0, a feedback position 1 is used; if a result is 1, a feedback position 2 is used; if a result is 2, a feedback position 3 is used; or if a result is 3, a feedback position 4 is used.

Based on distances from the sending-end UE, feedback positions are selected for a group feedback. For example, a communication distance of the service is 100 meters, and there are four feedback positions currently. In this case, receiving-end UE within a range of 0 to 25 meters from the sending-end UE uses a feedback position 1, receiving-end UE within a range of 25 to 50 meters from the sending-end UE uses a feedback position 2, receiving-end UE within a range of 50 to 75 meters from the sending-end UE uses a feedback position 3, and receiving-end UE within a range of 75 to 100 meters from the sending-end UE uses a feedback position 4. Alternatively, other unequal-distance algorithms are used to determine a manner of grouping by distance, where the manner of grouping by distance may be specified in a standard, or notified in configuration signaling, or specific content and identities in the grouping manner are specified in a standard, and the identities are notified to the receiving-end UEs in the configuration signaling or dynamic signaling.

Based on received signal strength, feedback positions are selected for a group feedback. For example, receiving-end UEs whose received signal strength are within a range are divided into one group, and a feedback is provided at a common position of the group.

After performing the foregoing decision process, the base station needs to send the specific HARQ feedback type configuration information to the sending-end UE.

In some embodiments of this disclosure, the data transmission method may further include:
  determining transmission resource pool information corresponding to a determined HARQ feedback type, where the transmission resource pool information includes feedback resource configuration information.

In some embodiments, the sending the HARQ feedback type configuration information to the sending terminal device may include:
  sending the HARQ feedback type configuration information including the transmission resource pool information to the sending terminal device.

Therefore, the base station can also send the corresponding resources to the sending-end UE, for example, send a transmission resource pool corresponding to the feedback type to the sending-end UE by using RRC signaling, so that the sending-end UE can select appropriate resources in the transmission resource pool for performing a data transmission.

Figure 3:
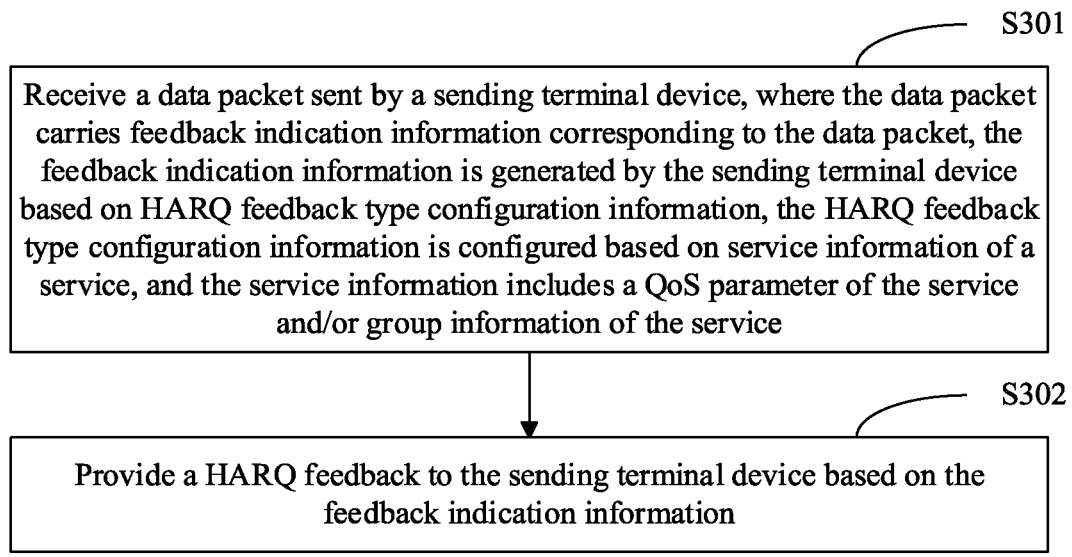
FIG. 3 is a schematic flowchart of a data transmission method according to an embodiment in a third aspect of this disclosure.

FIG. 3 is a schematic flowchart of a data transmission method according to an embodiment in a third aspect of this disclosure. As shown in FIG. 3, the data transmission method may be performed by a receiving terminal device, such as receiving-end UE. Specifically, the data transmission method may include the following steps.

S301. Receive a data packet sent by a sending terminal device, where the data packet includes feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service.

S302. Provide a HARQ feedback to the sending terminal device based on the feedback indication information.

In this embodiment of this disclosure, the HARQ feedback type configuration information of the sending terminal device can be determined based on the QoS parameter of the service and/or the group information of the service in the service information, and the data packet can be sent to the receiving terminal device based on the HARQ feedback type configuration information. Therefore, a plurality of feedback types are flexibly configured for a HARQ mechanism by using the service information. In addition, the receiving terminal device can provide a HARQ feedback based on the feedback indication information generated based on the HARQ feedback type configuration information. Therefore, feedback efficiency in a data transmission process is improved, and data transmission quality and data transmission efficiency are improved.

In some embodiments of this disclosure, the feedback indication information may include at least one of the following:

HARQ feedback requirement indication information, feedback resource configuration information, HARQ feedback requirement indication information for a plurality of feedback positions, feedback position number information, group feedback parameter information, and group feedback signal type information.

When receiving data, the receiving-end UE can obtain feedback indication information, to provide a feedback in a correct manner. For example, if the feedback indication information indicates that no feedback is required, the receiving-end UE only receives data; if the feedback indication information requires a feedback and the feedback is to be provided at one feedback position, the receiving-end UE feeds back a NACK signal at the feedback position when failing to receive the data packet; if the feedback indication information requires a feedback and each receiving-end UE provides a feedback at the feedback position of the receiving-end UE, the receiving-end UE finds the corresponding feedback position based on its own ID, and feeds back an ACK signal or a NACK signal according to whether the reception is successful; or if the feedback indication information requires a feedback and the receiving-end UE provides a group feedback, according to a grouping manner notified by a group feedback parameter, the receiving-end UE feeds back a NACK signal at a feedback position corresponding to the receiving-end UE in a case of failing to receive the data packet, or feeds back an ACK signal in a case of successfully receiving the data packet and feeds back a NACK signal in a case of failing to receive the data packet.

In some embodiments of this disclosure, the data packet further includes indication information about the maximum number of HARQ transmissions, the indication information about the maximum number of HARQ transmissions is used to indicate whether the current number of transmissions is equal to the maximum number of HARQ transmissions of the service corresponding to the data packet, and the maximum number of HARQ transmissions is configured based on the QoS parameter of the service.

In some embodiments of this disclosure, the data transmission method may further include:

in a case that the data packet fails to be received and the indication information about the maximum number of HARQ transmissions indicates that the current number of transmissions is not equal to the maximum number of HARQ transmissions, waiting for the sending terminal device to resend the data packet; or in a case that the data packet fails to be received and the indication information about the maximum number of HARQ transmissions indicates that the current number of transmissions is equal to the maximum number of HARQ transmissions, stopping waiting for the sending terminal device to resend the data packet.

For the receiving-end UE, first, before decoding the data successfully, the receiving-end UE cannot accurately obtain the QoS parameter of the service, and cannot know the maximum number of HARQ transmissions. Secondly, even in a case of unicast, by using RRC signaling, the sending-end UE can configure the maximum number of HARQ transmissions on the link for the receiving-end UE. The sending-end UE may also terminate a retransmission attempt in advance. Based on the foregoing reasons, the receiving-end UE does not know the HARQ retransmission attempt behavior. Therefore, after feeding back the NACK signal, the receiving-end UE can only maintain the HARQ process to wait for a possible retransmission by the sending-end UE. Because the total number of HARQ processes is limited, if all HARQ processes are occupied, other services cannot be received. Therefore, it is necessary to avoid unnecessary waiting for the retransmission of the HARQ process.

Therefore, when the sending-end UE sends the data packet, the data packet may include the indication information about the maximum number of HARQ transmissions to indicate whether this is a last transmission attempt, that is, indicate whether the current number of transmissions is the maximum number of HARQ transmissions. Generally, the indication information about the maximum number of HARQ transmissions is carried in control information, and a reception success rate of the control information is higher than that of data. For the receiving-end UE, if the received control information such as sidelink control information (SCI) indicates that this is not the last retransmission, and the receiving-end UE fails to perform reception, the receiving-end UE continues to wait; or if the received control information indicates that this is the last retransmission, and the receiving-end UE fails to perform reception, the receiving-end UE gives up waiting and releases the HARQ process.

In summary, according to the data transmission method in this embodiment of this disclosure, the sidelink can efficiently support a HARQ feedback, and different HARQ feedback types can be selected or configured based on different cases, to provide the HARQ feedback and perform the data retransmission better. Therefore, resource overheads can be reduced and overall data transmission efficiency and user experience can be improved while a transmission success rate is improved.

Figure 4:
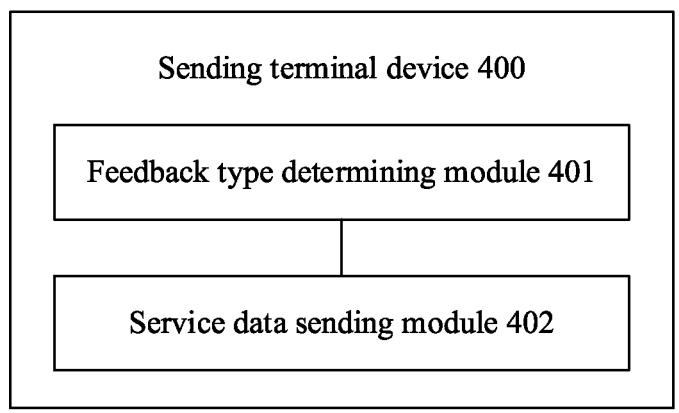
FIG. 4 is a schematic structural diagram of a sending terminal device according to an embodiment in a fourth aspect of this disclosure.

FIG. 4 is a schematic structural diagram of a sending terminal device according to an embodiment in a fourth aspect of this disclosure. The sending terminal device 400 may be, for example, sending-end UE. As shown in FIG. 4, the sending terminal device 400 may include:

a feedback type determining module 401, configured to determine HARQ feedback type configuration information of the sending terminal device, where the HARQ feedback type configuration information is configured based on service information of a service, and the service information includes a QoS parameter of the service and/or group information of the service; and a service data sending module 402, configured to send a data packet to a receiving terminal device based on the HARQ feedback type configuration information.

In this embodiment of this disclosure, the HARQ feedback type configuration information of the sending terminal device can be determined based on the QoS parameter of the service and/or the group information of the service in the service information, and the data packet can be sent to the receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

In some embodiments of this disclosure, the quality of service QoS parameter may include at least one of the following:

service rate information, delay information, priority information, and block error rate information.

In some embodiments of this disclosure, the group information may include at least a size of a group to which the service needs to be sent, that is, the total number of terminal devices in the group.

In some embodiments of this disclosure, the HARQ feedback type configuration information may include any one of the following:

information for indicating that none of the receiving terminal devices provides a feedback;

information for indicating that a receiving terminal device failing to receive the data packet feeds back a negative acknowledgement NACK signal at a same feedback position;

information for indicating that a receiving terminal device successfully receiving the data packet feeds back an acknowledgement ACK signal at a feedback position corresponding to the receiving terminal device, and indicating that a receiving terminal device failing to receive the data packet feeds back a NACK signal at a feedback position corresponding to the receiving terminal device;

information for indicating that the receiving terminal devices provide a feedback in groups, where a receiving terminal device failing to receive the data packet in each group feeds back a NACK signal at a feedback position corresponding to the group; and information for indicating that the receiving terminal devices provide a feedback in groups, where a receiving terminal device successfully receiving the data packet in each group feeds back an ACK signal at a feedback position corresponding to the group, and a receiving terminal device failing to receive the data packet in each group feeds back a NACK signal at a feedback position corresponding to the group.

In some embodiments of this disclosure, the feedback type determining module 401 may include:

a service information sending unit, configured to send the service information to a network device in a case that the sending terminal device is in a connected state; and a feedback type receiving unit, configured to receive the HARQ feedback type configuration information configured by the network device.

For the sending-end UE, when the sending-end UE needs to initiate a unicast service or a groupcast service, if the sending-end UE is in the connected state, the sending-end UE can directly interact with a base station. The sending-end UE may send the QoS parameter of the service corresponding to the to-be-sent data packet and/or the group information of the service to the base station, to request the base station to configure the HARQ feedback type configuration information for the sending-end UE.

Further, in some embodiments, the HARQ feedback type configuration information received by the feedback type receiving unit further includes transmission resource pool information, and the transmission resource pool information includes feedback resource configuration information, where a transmission resource pool corresponds to a HARQ feedback type.

If the network device also configures a corresponding transmission resource pool for the service, the HARQ feedback type configuration information configured by the network device for the service may further include transmission resource pool information, so that the sending-end UE can transmit the data packet in the transmission resource pool based on the HARQ feedback type configuration information.

In other embodiments of this disclosure, the feedback type determining module 401 may include:

a feedback type matching unit, configured to determine, according to a mapping rule in system information sent by a network device, the HARQ feedback type configuration information corresponding to the service information in a case that the sending terminal device is in a non-connected state.

For the sending-end UE, when the sending-end UE needs to initiate a unicast service or a groupcast service, if the sending-end UE is in the non-connected state, that is, the sending-end UE is idle/inactive sending-end UE, the sending-end UE does not need to interact with the base station, and the sending-end UE can autonomously determine, according to the stored mapping rule in the system information or the preconfigured mapping rule and the service information, the HARQ feedback type configuration information corresponding to the to-be-sent data packet.

Further, in some embodiments, the sending terminal device 400 may further include:

a state switching determining module, configured to determine whether to allow the sending terminal device to switch from the non-connected state to a connected state in a case that a feedback resource configuration of a common transmission resource pool does not meet a feedback requirement corresponding to the HARQ feedback type configuration information.

For example, in a case that a plurality of feedback positions are required for a HARQ feedback, if the common transmission resource pool cannot provide transmission resources of the corresponding feedback positions for the sending-end UE, that is, the feedback resource configuration of the common transmission resource pool does not meet the feedback requirement corresponding to the HARQ feedback type configuration information, it is necessary to determine whether the sending-end UE can be switched from the non-connected state to the connected state.

Further, in some embodiments, the sending terminal device 400 may further include:

a state switching execution module, configured to switch the sending terminal device from the non-connected state to the connected state if the feedback resource configuration does not meet the feedback requirement and the sending terminal device is allowed to switch from the non-connected state to the connected state.

Specifically, if the HARQ feedback mode is a plurality of feedbacks, and the maximum number of feedback positions allowed by the common transmission resource pool is less than the number of receiving terminal devices in the group information, and the HARQ feedback allows the sending terminal device to switch from the non-connected state to the connected state, the sending-end UE can be switched from the non-connected state to the connected state. For example, the sending-end UE may be enabled to establish an RRC connection, and then enter the connected state, and request an appropriate resource from the network device by using dedicated signaling.

In some embodiments of this disclosure, the mapping rule may include at least one of the following:

a mapping relationship between a standardized QoS parameter and a HARQ feedback requirement;
a mapping relationship between a standardized QoS parameter and a HARQ feedback requirement for a plurality of feedback positions;
a mapping relationship between a standardized QoS parameter and the maximum number of feedback positions supported for a HARQ feedback;
a mapping relationship between one or more QoS parameters meeting a predetermined condition and a HARQ feedback requirement;
a mapping relationship between one or more QoS parameters meeting a predetermined condition and a HARQ feedback requirement for a plurality of feedback positions; and
a mapping relationship between one or more QoS parameters meeting a predetermined condition and the maximum number of feedback positions supported for a HARQ feedback.

In other embodiments of this disclosure, the mapping rule may further include at least one of the following:
determining the HARQ feedback type configuration information based on the group information;
determining the HARQ feedback type configuration information based on the number of receiving terminal devices in the group information and the maximum number of feedback positions of the service;
determining the HARQ feedback type configuration information based on the number of receiving terminal devices in the group information and the number of feedback positions in a transmission resource pool; and
determining the HARQ feedback type configuration information based on the number of receiving terminal devices in the group information, the maximum number of feedback positions of the service, and the number of feedback positions in the transmission resource pool.

In some embodiments of this disclosure, the service data sending module 402 may include:
an indication information generation unit, configured to generate feedback indication information based on the HARQ feedback type configuration information; and
a first data sending unit, configured to send the data packet carrying the feedback indication information to the receiving terminal device.

Therefore, when sending the data packet, the sending-end UE needs to directly notify the receiving-end UE how to provide a feedback based on the feedback indication information.

In some embodiments of this disclosure, the feedback indication information may include at least one of the following:
HARQ feedback requirement indication information, feedback resource configuration information, HARQ feedback requirement indication information for a plurality of feedback positions, feedback position number information, group feedback parameter information, and group feedback signal type information.

In some embodiments of this disclosure, the sending terminal device 400 may further include:
a transmission number determining module, configured to determine the maximum number of HARQ transmissions of the service.

Further, in some embodiments, the service data sending module 402 may include:
a second data sending unit, configured to send the data packet including indication information about the maximum number of HARQ transmissions to the receiving terminal device, where the indication information about the maximum number of HARQ transmissions is used to indicate whether the current number of transmissions is the maximum number of HARQ transmissions.

Specifically, before sending a data packet each time, the sending terminal device determines whether the current number of transmissions is the maximum number of HARQ transmissions, and generates indication information about the maximum number of HARQ transmissions, so that the receiving terminal device can determine, based on the indication information about the maximum number of HARQ transmissions, whether the current number of transmissions is the maximum number of HARQ transmissions.

In some embodiments of this disclosure, the transmission number determining module may include:
a requirement parameter sending unit, configured to send the QoS parameter of the service to a network device in a case that the sending terminal device is in a connected state; and
a transmission number receiving unit, configured to receive the maximum number of HARQ transmissions configured by the network device.

In a case that the sending terminal device is in the connected state, because the maximum number of HARQ transmissions is configured based on the QoS parameter, the sending-end UE in the connected state can report the QoS parameter to the base station, and obtain a configuration value of the maximum number of HARQ transmissions from the base station.

In other embodiments of this disclosure, the transmission number determining module may include:
a transmission number matching unit, configured to determine, based on a mapping relationship between a QoS parameter and a transmission parameter in system information sent by a network device, the maximum number of HARQ transmissions of the service in a case that the sending terminal device is in a non-connected state.

In the case in which the sending terminal device is in the non-connected state, the maximum number of HARQ transmissions of the service is determined based on the mapping relationship between the QoS parameter and the transmission parameter in the system information sent by the network device.

The sending terminal device provided in this embodiment of this disclosure implements each process implemented by the terminal device in the method embodiment in FIG. 1. To avoid repetition, details are not described herein again.

Figure 5:
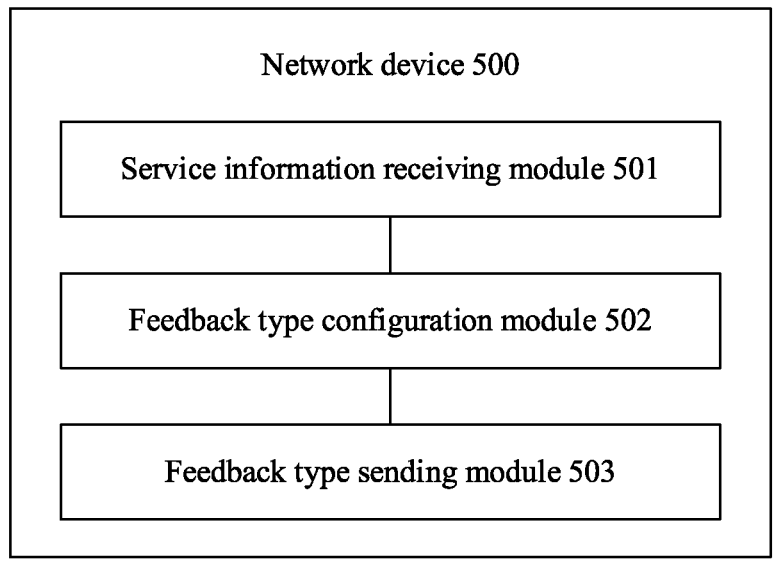
FIG. 5 is a schematic structural diagram of a network device according to an embodiment in a fifth aspect of this disclosure.

FIG. 5 is a schematic structural diagram of a network device according to an embodiment in a fifth aspect of this disclosure. The network device 500 may be, for example, a base station. As shown in FIG. 5, the network device 500 may include:
a service information receiving module 501, configured to receive service information sent by a sending terminal device, where the service information includes a QoS parameter of a service and/or group information of the service;
a feedback type configuration module 502, configured to configure HARQ feedback type configuration information based on the service information; and
a feedback type sending module 503, configured to send the HARQ feedback type configuration information to the sending terminal device.

In this embodiment of this disclosure, the HARQ feedback type configuration information of the sending terminal device can be determined based on the QoS parameter of the service and/or the group information of the service in the service information, and a data packet can be sent to a receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

In some embodiments of this disclosure, the QoS parameter may include at least one of the following:

service rate information, delay information, priority information, and block error rate information.

In some embodiments of this disclosure, the group information may include at least a size of a group to which the service needs to be sent, that is, the total number of terminal devices in the group.

In some embodiments of this disclosure, the network device 500 may further include:

a resource information determining module, configured to determine transmission resource pool information corresponding to a determined HARQ feedback type, where the transmission resource pool information includes feedback resource configuration information; and further, in some embodiments, the feedback type sending module 503 may be specifically configured to send the HARQ feedback type configuration information including the transmission resource pool information to the sending terminal device.

The network device provided in this embodiment of this disclosure implements each process implemented by the network device in the method embodiment in FIG. 2. To avoid repetition, details are not described herein again.

Figure 6:
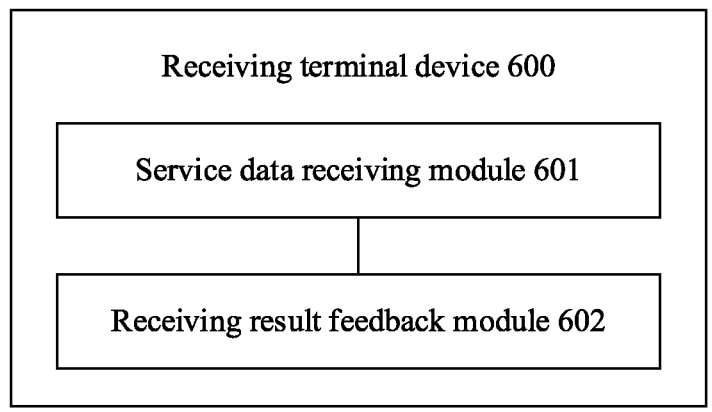
FIG. 6 is a schematic structural diagram of a receiving terminal device according to an embodiment in a sixth aspect of this disclosure.

FIG. 6 is a schematic structural diagram of a receiving terminal device according to an embodiment in a sixth aspect of this disclosure. The receiving terminal device 600 may be, for example, receiving-end UE. As shown in FIG. 6, the receiving terminal device 600 may include:

a service data receiving module 601, configured to receive a data packet sent by a sending terminal device, where the data packet includes feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service; and a receiving result feedback module 602, configured to provide a HARQ feedback to the sending terminal device based on the feedback indication information.

In this embodiment of this disclosure, the HARQ feedback type configuration information of the sending terminal device can be determined based on the QoS parameter of the service and/or the group information of the service in the service information, and the data packet can be sent to the receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

In some embodiments of this disclosure, the data packet may further include indication information about the maximum number of HARQ transmissions, the indication information about the maximum number of HARQ transmissions is used to indicate whether the current number of transmissions is equal to the maximum number of HARQ transmissions of the service corresponding to the data packet, and the maximum number of HARQ transmissions is configured based on the QoS parameter of the service.

Further, in some embodiments, the receiving terminal device 600 further includes:

a transmission waiting determining module, configured to: in a case that the data packet fails to be received and the indication information about the maximum number of HARQ transmissions indicates that the current number of transmissions is not equal to the maximum number of HARQ transmissions, wait for the sending terminal device to resend the data packet; or in a case that the data packet fails to be received and the indication information about the maximum number of HARQ transmissions indicates that the current number of transmissions is equal to the maximum number of HARQ transmissions, stop waiting for the sending terminal device to resend the data packet.

Therefore, when the sending-end UE sends the data packet, the data packet may carry the indication information about the maximum number of HARQ transmissions to indicate whether this is a last transmission attempt, that is, indicate whether the current number of transmissions is the maximum number of HARQ transmissions. Generally, the indication information about the maximum number of HARQ transmissions is carried in control information, and a reception success rate of the control information is higher than that of data. For the receiving-end UE, if the received control information such as SCI indicates that this is not the last retransmission, and the receiving-end UE fails to perform reception, the receiving-end UE continues to wait; or if the received control information indicates that this is the last retransmission, and the receiving-end UE fails to perform reception, the receiving-end UE gives up waiting and releases the HARQ process.

The receiving terminal device provided in this embodiment of this disclosure implements each process implemented by the terminal device in the method embodiment in FIG. 3. To avoid repetition, details are not described herein again.

An embodiment of this disclosure further provides a terminal device, including a processor, a memory, and a computer program stored in the memory and capable of running on the processor. When the computer program is executed by the processor, each process of the foregoing embodiment of the data transmission method performed by the sending terminal device according to the first aspect of this disclosure or each process of the foregoing embodiment of the data transmission method performed by the receiving terminal device according to the third aspect of this disclosure is implemented, with the same technical effect achieved. To avoid repetition, details are not described herein again.

Figure 7:
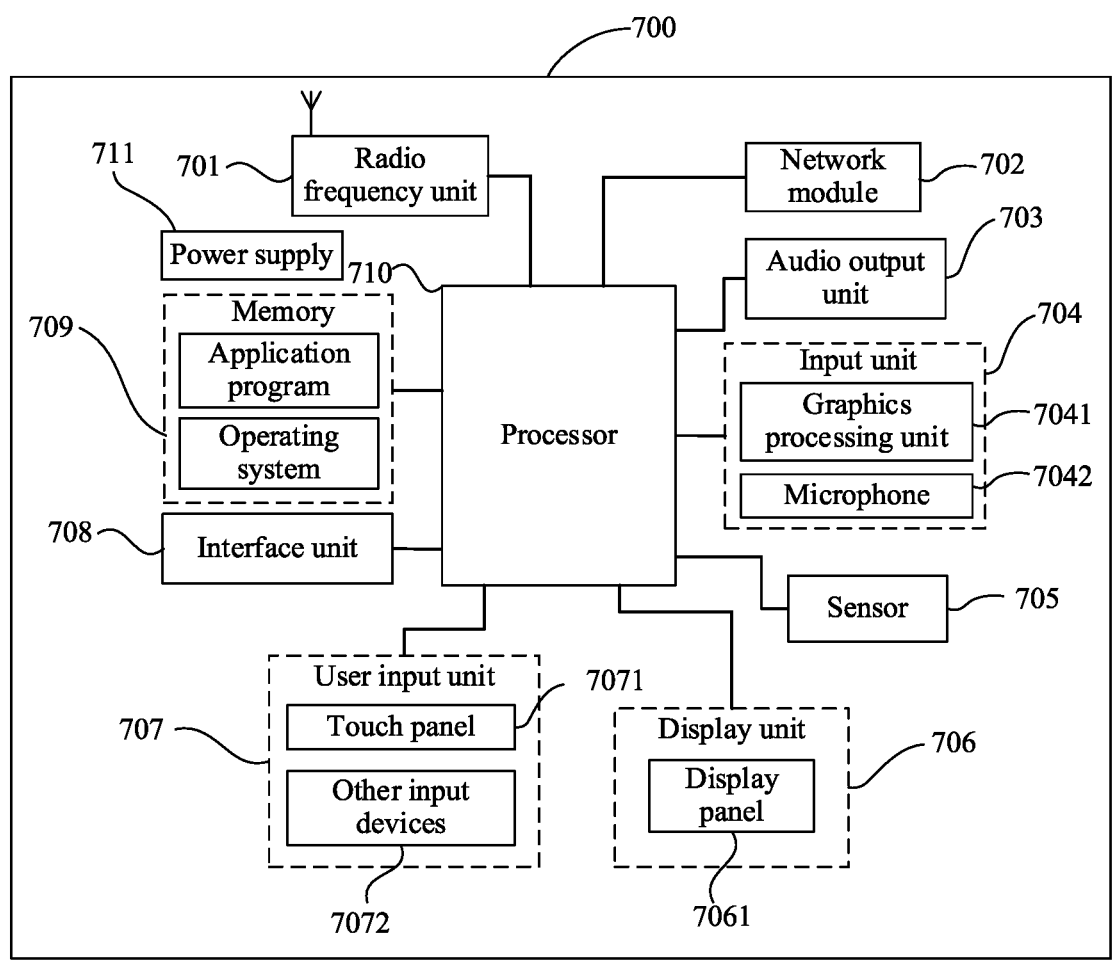
FIG. 7 is a schematic diagram of an example hardware structure of a terminal device according to an embodiment in a seventh aspect of this disclosure.

FIG. 7 is a schematic diagram of an example hardware structure of a terminal device according to a seventh aspect of this disclosure. As shown in FIG. 7, the terminal device 700 may be, for example, a sending terminal device or a receiving terminal device. This is not limited herein.

Referring to FIG. 7, the terminal device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art can understand that the structure of the terminal device shown in FIG. 7 does not constitute any limitation on the terminal device. The terminal device may include more or fewer components than those shown in the figure, or a combination of some components, or the components disposed differently. In this embodiment of this disclosure, the terminal device includes but is not limited to a mobile phone, a tablet computer, a laptop computer, a palmtop computer, an in-vehicle terminal, a wearable device, a pedometer, and the like.

The processor 710 is a control center of the terminal device, uses various interfaces and lines to connect parts of the entire terminal device, and executes various functions and processing data of the terminal device by running or executing software programs and/or modules stored in the memory 709 and invoking data stored in the memory 709, so as to perform overall monitoring on the terminal device. The processor 710 may include one or more processing units. Optionally, an application processor and a modem processor may be integrated in the processor 710. The application processor primarily processes an operating system, user interfaces, application programs, and the like. The modem processor primarily processes radio communication. It can be understood that the modem processor may be alternatively not integrated in the processor 710.

The memory 709 may be configured to store software programs and various data. The memory 709 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 709 may include a high-speed random access memory, and may further include a non-volatile memory such as a disk storage device, a flash memory device, or another volatile solid-state storage device.

In this embodiment, the processor 710 may run a software program stored in the memory 709 to implement operations of the foregoing data transmission method. For example, the processor 710 may be configured to:

determine hybrid automatic repeat request HARQ feedback type configuration information of a sending terminal device, where the HARQ feedback type configuration information is configured based on service information of a service, and the service information includes a quality of service QoS parameter of the service and/or group information of the service; and send a data packet to a receiving terminal device based on the HARQ feedback type configuration information; or may be configured to receive a data packet sent by a sending terminal device, where the data packet includes feedback indication information corresponding to the data packet, the feedback indication information is generated by the sending terminal device based on HARQ feedback type configuration information, the HARQ feedback type configuration information is configured based on service information of a service, and the service information includes a QoS parameter of the service and/or group information of the service; and provide a HARQ feedback to the sending terminal device based on the feedback indication information.

In this embodiment of this disclosure, the HARQ feedback type configuration information of the sending terminal device can be determined based on the QoS parameter of the service and/or the group information of the service in the service information, and the data packet can be sent to the receiving terminal device based on the HARQ feedback type configuration information. Therefore, a plurality of feedback types are flexibly configured for a HARQ mechanism by using the service information, feedback efficiency in a data transmission process is improved, and data transmission quality and data transmission efficiency are improved.

It should be understood that in this embodiment of this disclosure, the radio frequency unit 701 may be configured to receive and send information, or to receive and send a signal in a call process, and specifically, after receiving downlink data from a base station, send the downlink data to the processor 710 for processing; and also send uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may also communicate with a network and other devices via a wireless communications system.

The terminal device provides a user with wireless broadband internet access through the network module 702, for example, helping the user transmit and receive e-mails, browse web pages, and access streaming media.

The audio output unit 703 may convert audio data received by the radio frequency unit 701 or the network module 702 or stored in the memory 709 into an audio signal and output the audio signal as a sound. Furthermore, the audio output unit 703 may also provide an audio output (for example, a call signal received sound or a message received sound) related to a specific function performed by the terminal device 700. The audio output unit 703 includes a speaker, a buzzer, a receiver, and the like.

The input unit 704 is configured to receive an audio or video signal. The input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or be sent by the radio frequency unit 701 or the network module 702. The microphone 7042 is capable of receiving sounds and processing such sounds into audio data. The processed audio data can be converted into a format output that can be sent to a mobile communication base station through the radio frequency unit 701 in a telephone call mode.

The terminal device 700 further includes at least one sensor 705, for example, an optical sensor, a motion sensor, and other sensors. Specifically, the optical sensor includes an ambient light sensor and a proximity sensor. The ambient light sensor may adjust luminance of the display panel 7061 based on brightness of ambient light, and the proximity sensor may turn off the display panel 7061 and/or backlight when the terminal device 700 moves close to an ear. As a type of motion sensor, an accelerometer sensor can detect magnitudes of accelerations in all directions (usually three axes), can detect a magnitude and a direction of gravity when the terminal device is in a static state, and can be applied to posture recognition (such as screen switching between portrait and landscape, related games, and magnetometer posture calibration) of the terminal device, functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided to the user. The display unit 706 may include a display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of the terminal device. Specifically, the user input unit 707 includes a touch panel 7071 and other input devices 7072. The touch panel 7071 is also referred to as a touchscreen and can collect a touch operation (such as an operation performed by the user on the touch panel 7071 or near the touch panel 7071 with a finger or by using any proper object or accessory such as a stylus) of the user on or near the touch panel 7071. The touch panel 7071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 710, and receives a command sent by the processor 710 and executes the command. In addition, the touch panel 7071 may be implemented in a plurality of forms, for example, as a resistive, capacitive, infrared, or surface acoustic wave touch panel. The user input unit 707 may further include the other input devices 7072 in addition to the touch panel 7071. Specifically, the other input devices 7072 may include but are not limited to a physical keyboard, a function key (such as a volume control key or a switch key), a trackball, a mouse, and a joystick. Details are not described herein.

Further, the touch panel 7071 may cover the display panel 7061. When detecting a touch operation on or near the touch panel 7071, the touch panel 7071 transmits the touch operation to the processor 710 to determine a type of a touch event. Then, the processor 710 provides a corresponding visual output on the display panel 7061 based on the type of the touch event. Although in FIG. 7, the touch panel 7071 and the display panel 7061 act as two independent parts to implement input and output functions of the terminal device, in some embodiments, the touch panel 7071 and the display panel 7061 may be integrated to implement the input and output functions of the terminal device. This is not specifically limited herein.

The interface unit 708 is an interface between an external apparatus and the terminal device 700. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 708 may be configured to: receive an input (for example, data information and power) from the external apparatus, and transmit the received input to one or more elements in the terminal device 700, or may be configured to transmit data between the terminal device 700 and the external apparatus.

The terminal device 700 may further include a power supply 711 (such as a battery) that supplies power to components. Optionally, the power supply 711 may be logically connected to the processor 710 through a power management system. In this way, functions such as charge management, discharge management, and power consumption management are implemented by using the power management system.

In addition, the terminal device 700 includes some functional modules that are not shown. Details are not described herein.

An embodiment of this disclosure further provides a network device, including a processor, a memory, and a computer program stored in the memory and capable of running on the processor. When the computer program is executed by the processor, each process of the foregoing embodiment of the data transmission method performed by the network device in the second aspect of this disclosure is implemented, with the same technical effect achieved. To avoid repetition, details are not described herein again.

An embodiment of this disclosure further provides a computer-readable storage medium, where the computer-readable storage medium stores a computer program. When the computer program is executed by a processor, each process of the foregoing embodiment of the data transmission method is implemented, with the same technical effect achieved. To avoid repetition, details are not described herein again. The computer-readable storage medium includes, for example, a non-transitory computer-readable storage medium, such as a read-only memory (ROM for short), a random access memory (RAM for short), a magnetic disk, or an optical disc.

The aspects of this disclosure are described above with reference to the flowcharts and/or block diagrams of the methods, apparatuses (systems), and computer program products according to the embodiments of this disclosure. It should be understood that each block in the flowcharts and/or block diagrams, and a combination of blocks in the flowcharts and/or block diagrams may be implemented by using computer program instructions. These computer program instructions may be provided for a general-purpose computer, a special-purpose computer, or a processor of any other programmable data processing apparatus to generate a machine, so that the computer or the processor of any other programmable data processing apparatus can execute the instructions to implement functions or actions specified in one or more blocks in the flowcharts and/or block diagrams. The processor may be but is not limited to a general-purpose processor, a special-purpose processor, an application-specific processor, or a field programmable logic circuit. It may also be understood that each block in the block diagrams and/or the flowcharts and a combination of the blocks in the block diagrams and/or the flowcharts may also be implemented by dedicated hardware for executing a specified function or action or may be implemented by a combination of dedicated hardware and computer instructions.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, a person of ordinary skill in the art may develop many other forms without departing from principles of this disclosure and the protection scope of the claims, and all such forms fall within the protection scope of this disclosure.

What is claimed is:

1. A data transmission method, applied to a sending terminal device and comprising:
   determining hybrid automatic repeat request (HARQ) feedback type configuration information of the sending terminal device, wherein the HARQ feedback type configuration information is configured based on service information of a service, and the service information comprises a quality of service (QOS) parameter of the service and/or group information of the service; and
   sending a data packet to a receiving terminal device based on the HARQ feedback type configuration information;
   wherein the determining HARQ feedback type configuration information of the sending terminal device comprises:
   in a case that the sending terminal device is in a non-connected state, determining, according to a mapping rule in system information sent by a network device, the HARQ feedback type configuration information corresponding to the service information;
   wherein the determining, according to a mapping rule in system information sent by a network device, the HARQ feedback type configuration information corresponding to the service information comprises at least one of:
   determining the HARQ feedback type configuration information based on the number of receiving terminal devices in the group information and the maximum number of feedback positions of the service;
   determining the HARQ feedback type configuration information based on the number of receiving terminal devices in the group information and the number of feedback positions in a transmission resource pool; and
   determining the HARQ feedback type configuration information based on the number of receiving terminal devices in the group information, the maximum number of feedback positions of the service, and the number of feedback positions in the transmission resource pool.

2. The method according to claim 1, wherein the HARQ feedback type configuration information comprises any one of the following:
   information for indicating that none of the receiving terminal devices provides a feedback;
   information for indicating that a receiving terminal device failing to receive the data packet feeds back a negative acknowledgement (NACK) signal at a same feedback position;
   information for indicating that a receiving terminal device successfully receiving the data packet feeds back an acknowledgement (ACK) signal at a feedback position corresponding to the receiving terminal device, and indicating that a receiving terminal device failing to receive the data packet feeds back a NACK signal at a feedback position corresponding to the receiving terminal device;
   information for indicating that the receiving terminal devices provide a feedback in groups, wherein a receiving terminal device failing to receive the data packet in each group feeds back a NACK signal at a feedback position corresponding to the group; and
   information for indicating that the receiving terminal devices provide a feedback in groups, wherein a receiving terminal device successfully receiving the data packet in each group feeds back an ACK signal at a feedback position corresponding to the group, and a receiving terminal device failing to receive the data packet in each group feeds back a NACK signal at a feedback position corresponding to the group.

3. The method according to claim 1, wherein the determining HARQ feedback type configuration information of the sending terminal device further comprises:
   in a case that the sending terminal device is in a connected state, sending the service information to a network device; and
   receiving the HARQ feedback type configuration information configured by the network device.

4. The method according to claim 3, wherein the HARQ feedback type configuration information further comprises transmission resource pool information, and the transmission resource pool information comprises feedback resource configuration information, wherein a transmission resource pool corresponds to a HARQ feedback type.

5. The method according to claim 1, wherein after the determining, according to a mapping rule in system information sent by a network device, the HARQ feedback type configuration information corresponding to the service information, the method further comprises:
   in a case that a feedback resource configuration of a common transmission resource pool does not meet a feedback requirement corresponding to the HARQ feedback type configuration information, determining whether to allow the sending terminal device to switch from the non-connected state to a connected state.

6. The method according to claim 5, wherein after the determining whether to allow the sending terminal device to switch from the non-connected state to a connected state, the method further comprises:
   if the feedback resource configuration does not meet the feedback requirement and the sending terminal device is allowed to switch from the non-connected state to the connected state, switching the sending terminal device from the non-connected state to the connected state.

7. The method according to claim 1, wherein the mapping rule comprises at least one of the following:
   a mapping relationship between a standardized QoS parameter and a HARQ feedback requirement;
   a mapping relationship between a standardized QoS parameter and a HARQ feedback requirement for a plurality of feedback positions;
   a mapping relationship between a standardized QoS parameter and the maximum number of feedback positions supported for a HARQ feedback;
   a mapping relationship between one or more QoS parameters meeting a predetermined condition and a HARQ feedback requirement;
   a mapping relationship between one or more QoS parameters meeting a predetermined condition and a HARQ feedback requirement for a plurality of feedback positions; and
   a mapping relationship between one or more QoS parameters meeting a predetermined condition and the maximum number of feedback positions supported for a HARQ feedback.

8. The method according to claim 7, wherein the determining, according to a mapping rule in system information sent by a network device, the HARQ feedback type configuration information corresponding to the service information further comprises:

determining the HARQ feedback type configuration information based on the group information.

9. The method according to claim 1, wherein the sending a data packet to a receiving terminal device based on the HARQ feedback type configuration information comprises:
generating feedback indication information based on the HARQ feedback type configuration information; and
sending the data packet comprising the feedback indication information to the receiving terminal device.

10. The method according to claim 9, wherein the feedback indication information comprises at least one of the following:
HARQ feedback requirement indication information, feedback resource configuration information, HARQ feedback requirement indication information for a plurality of feedback positions, feedback position number information, group feedback parameter information, and group feedback signal type information.

11. The method according to claim 1, further comprising:
determining the maximum number of HARQ transmissions of the service;
wherein the sending a data packet to a receiving terminal device comprises:
sending the data packet comprising indication information about the maximum number of HARQ transmissions to the receiving terminal device, wherein the indication information about the maximum number of HARQ transmissions is used to indicate whether the current number of transmissions is the maximum number of HARQ transmissions.

12. The method according to claim 11, wherein the determining the maximum number of HARQ transmissions of the service comprises:
in a case that the sending terminal device is in a connected state, sending the QoS parameter of the service to a network device; and
receiving the maximum number of HARQ transmissions configured by the network device;
or
wherein the determining the maximum number of HARQ transmissions of the service comprises:
in a case that the sending terminal device is in a non-connected state, determining, based on a mapping relationship between a QoS parameter and a transmission parameter in system information sent by a network device, the maximum number of HARQ transmissions of the service.

13. A data transmission method, applied to a network device and comprising:
receiving service information sent by a sending terminal device, wherein the service information comprises a quality of service (QOS) parameter of a service and/or group information of the service;
configuring hybrid automatic repeat request (HARQ) feedback type configuration information based on the service information; and
sending the HARQ feedback type configuration information to the sending terminal device;
wherein the method further comprises:
sending system information comprising a mapping rule to the sending terminal device, to cause the sending terminal device to determine the HARQ feedback type configuration information according to the mapping rule in in a case that the sending terminal device is in a non-connected state, wherein the HARQ feedback type configuration information is determined according to at least one of:

the number of receiving terminal devices in the group information and the maximum number of feedback positions of the service;
the number of receiving terminal devices in the group information and the number of feedback positions in a transmission resource pool; and
the number of receiving terminal devices in the group information, the maximum number of feedback positions of the service, and the number of feedback positions in the transmission resource pool.

14. The method according to claim 13, further comprising:
determining transmission resource pool information corresponding to a determined HARQ feedback type, wherein the transmission resource pool information comprises feedback resource configuration information; and
the sending the HARQ feedback type configuration information to the sending terminal device comprises:
sending the HARQ feedback type configuration information comprising the transmission resource pool information to the sending terminal device.

15. A data transmission method, applied to a receiving terminal device and comprising:
receiving a data packet sent by a sending terminal device, wherein the data packet comprises feedback indication information corresponding to the data packet, the feedback indication information is generated by the sending terminal device based on hybrid automatic repeat request (HARQ) feedback type configuration information, the HARQ feedback type configuration information is configured based on service information of a service, and the service information comprises a quality of service (QOS) parameter of the service and/or group information of the service; and
providing a HARQ feedback to the sending terminal device based on the feedback indication information;
wherein the HARQ feedback type configuration information is configured by a network device based on the service information sent by the sending terminal device in a case that the sending terminal device is in a connected state, and the HARQ feedback type configuration information is determined by the sending terminal device according to a mapping rule in system information sent by a network device in a case that the sending terminal device is in a non-connected state; and
wherein that the HARQ feedback type configuration information is determined by the sending terminal device according to the mapping rule refers to at least one of:
the HARQ feedback type configuration information is determined based on the number of receiving terminal devices in the group information and maximum number of feedback positions of the service;
the HARQ feedback type configuration information is determined based on the number of receiving terminal devices in the group information and the number of feedback positions in a transmission resource pool; and
the HARQ feedback type configuration information is determined based on the number of receiving terminal devices in the group information, the maximum number of feedback positions of the service, and the number of feedback positions in the transmission resource pool.

16. The method according to claim 15, wherein the data packet further comprises indication information about the maximum number of HARQ transmissions, the indication information about the maximum number of HARQ transmissions is used to indicate whether the current number of transmissions is equal to the maximum number of HARQ transmissions of the service corresponding to the data packet, and the maximum number of HARQ transmissions is configured based on the QoS parameter of the service.

17. The method according to claim 16, further comprising:
- in a case that the data packet fails to be received and the indication information about the maximum number of HARQ transmissions indicates that the current number of transmissions is not equal to the maximum number of HARQ transmissions, waiting for the sending terminal device to resend the data packet; or
- in a case that the data packet fails to be received and the indication information about the maximum number of HARQ transmissions indicates that the current number of transmissions is equal to the maximum number of HARQ transmissions, stopping waiting for the sending terminal device to resend the data packet.

18. A terminal device, comprising a processor, a memory, and a computer program stored in the memory and capable of running on the processor, wherein when the computer program is executed by the processor, the steps of the data transmission method according to claim 1 are implemented.

19. A terminal device, comprising a processor, a memory, and a computer program stored in the memory and capable of running on the processor, wherein when the computer program is executed by the processor, the steps of the data transmission method according to claim 15 are implemented.

20. A network device, comprising a processor, a memory, and a computer program stored in the memory and capable of running on the processor, wherein when the computer program is executed by the processor, the steps of the data transmission method according to claim 13 are implemented.

* * * * *